United States Patent [19]

Meserve

[11] 3,766,690
[45] Oct. 23, 1973

[54] GRINDING TOOL
[75] Inventor: F. Clayton Meserve, North Andover, Mass.
[73] Assignee: Bandag Incorporated, Muscatine, Iowa
[22] Filed: Sept. 24, 1971
[21] Appl. No.: 183,443

[52] U.S. Cl. .................................. 51/173, 51/247
[51] Int. Cl. ........................... B24b 3/36, B24b 9/00
[58] Field of Search .......................... 51/173, 247

[56] References Cited
UNITED STATES PATENTS
3,574,251   3/1971   Corti ............................ 51/247 X
1,443,150   1/1923   Schimmel ........................ 51/173

Primary Examiner—Othell M. Simpson
Attorney—Herbert W. Kenway et al.

[57] ABSTRACT

A tool for grinding and sharpening a blade which operates in a fixed helical path, that is to say, a tool constructed and arranged to maintain the same predetermined helical contour of the blade while being sharpened.

5 Claims, 5 Drawing Figures

Patented Oct. 23, 1973

INVENTOR
F. CLAYTON MESERVE

BY
Henway Jenney & Hildreth

ATTORNEYS

Patented Oct. 23, 1973

INVENTOR
F. CLAYTON MESERVE
BY
ATTORNEYS

GRINDING TOOL

The present invention solves the difficult problem of grinding and sharpening the operative edge of a flexible blade which must be maintained in a fixed helical contour without distortion. Such a blade is the subject matter of my pending application Ser. No. 853,768 filed Aug. 28, 1969 where the blade forms one component of a siping machine employing a threaded drum by which tire stock or the like is siped effectively at high speed. The work is fed to the blade by engagement with a drum having a pronounced helical thread and the blade is mounted in the drum in step with the threads thereof. Difficulty has been experienced heretofore in grinding and sharpening such a blade without disturbing the helical arrangement which is now established in the siping machine.

The present invention comprises a new and improved portable tool including a frame shaped so that it may be applied to the surface of the helical drum and partake of its helical rotation without any departure from the original helix angle.

As herein shown the frame of the tool is V-shaped in cross section and provided with spaced guide studs by which the helical movement of the threads of the drum is accurately transferred to a grinding wheel mounted in the frame of the tool. Provision is made for adjusting the grinding wheel to control the depth of the grinding cut and also to true the cutting angle of the wheel.

These and other features of the invention will be best understood and appreciated from the following description of a preferred embodiment thereof selected for purposes of illustration and shown in the accompanying drawings, in which.

Figures 1, 2:
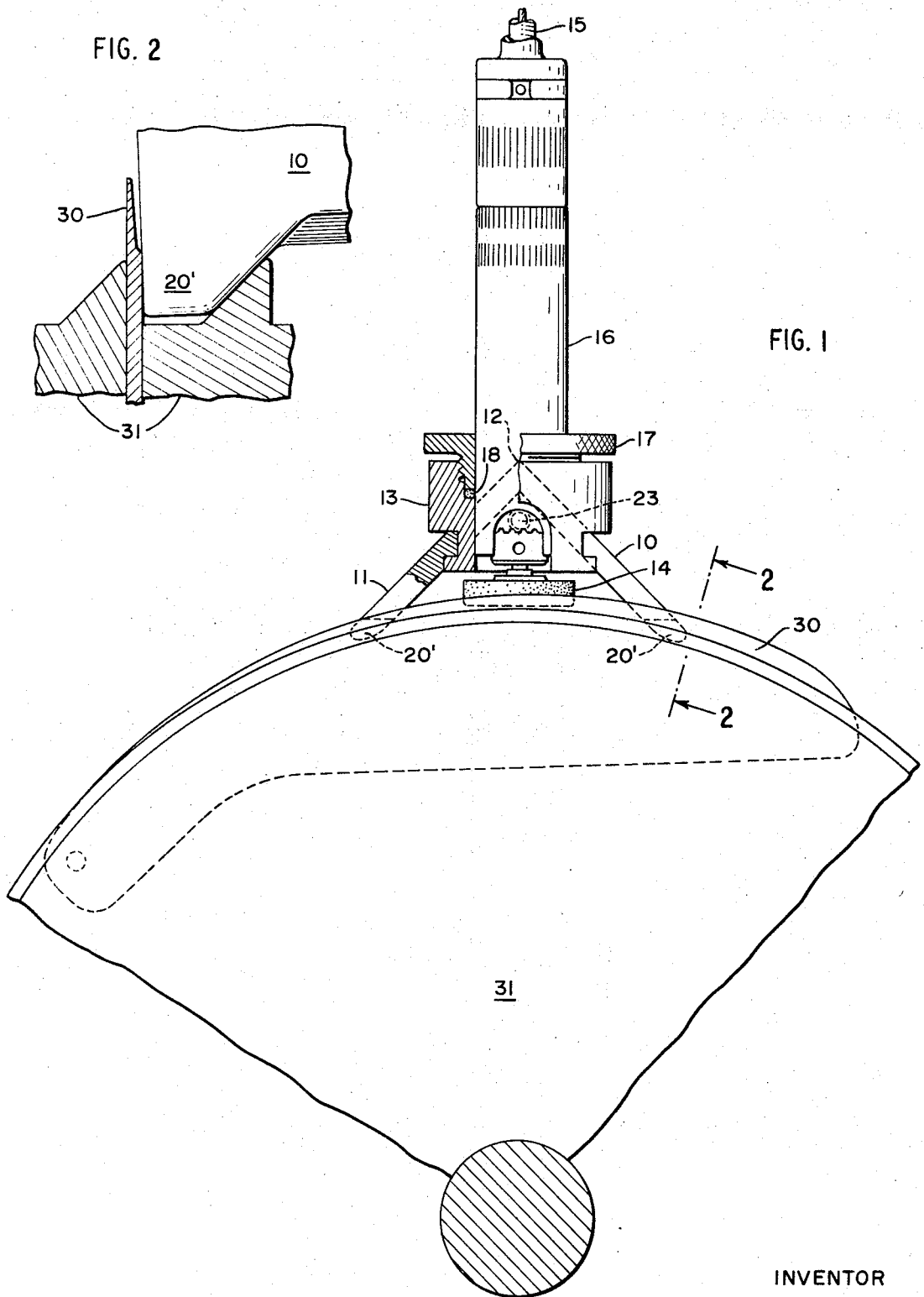
FIG. 1 is a view in elevation partly in section.
FIG. 2 is a fragmentary detail on an enlarged scale.

The tool comprises a frame having convergent side sections 10 and 11 welded together at the vertex line 12. These side sections merge at substantially right angles and are together cut away at one end to provide an open space thus giving the frame a forked formation. The cut away edges of the frame are shaped to provide a horizontal guideway in which is mounted a circular carrier block 13 for the grinding wheel 14 and its spindle 15. A hollow shaft 16 having a circular bushing 17 is secured to the carrier block through the medium of an 0-ring 18.

At each corner the frame is provided with guide studs 20 or 20' arranged to run freely in the thread of the drum and free to be moved back and forth in the predetermined path determined for it by the thread of the drum. By adjusting these studs 20 and 20' the end face of the grinding wheel may be set to move in whatever may be the desired angular position of the wheel for contact with the inclined face of the thread.

The hollow shaft 16 acts as a casing for the spindle 15 and has at its outer end connections for attachment to a flexible high speed driving shaft. The depth of the siping cuts may be adjusted by loosening the drum sections and then swinging the blade about its pivotal connection within the body of the drum. The depth of the siping cuts may be further limited by manipulation of the guide studs 20.

The grinding tool of my invention is shown herein in its application to the grinding and sharpening of the blade of the siping machine above identified. The blade therein shown is a sector 30 of flexible steel and is securely clamped in helical formation between two sections of the threaded drum 31. These are shaped to impart helical conformation to the blade in exact conformity to the thread of the drum 31.

Figure 4:
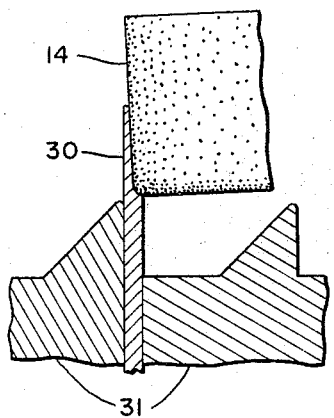
FIG. 4 is a fragmentary view showing the relationship of grinding wheel and knife.
Figure 3:
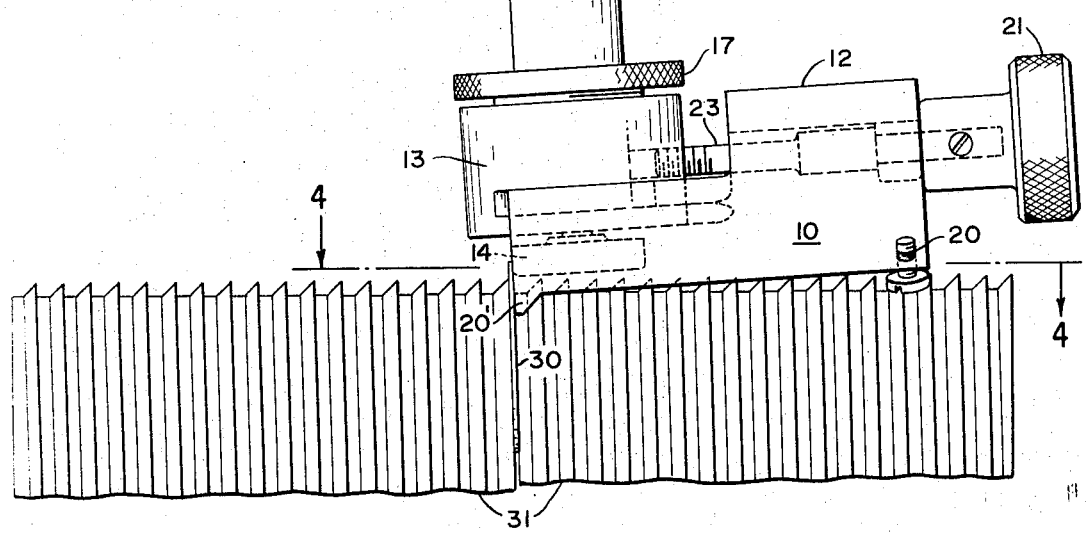
FIG. 3 is a sectional view on the line 3—3 of FIG. 1.
Figure 5:
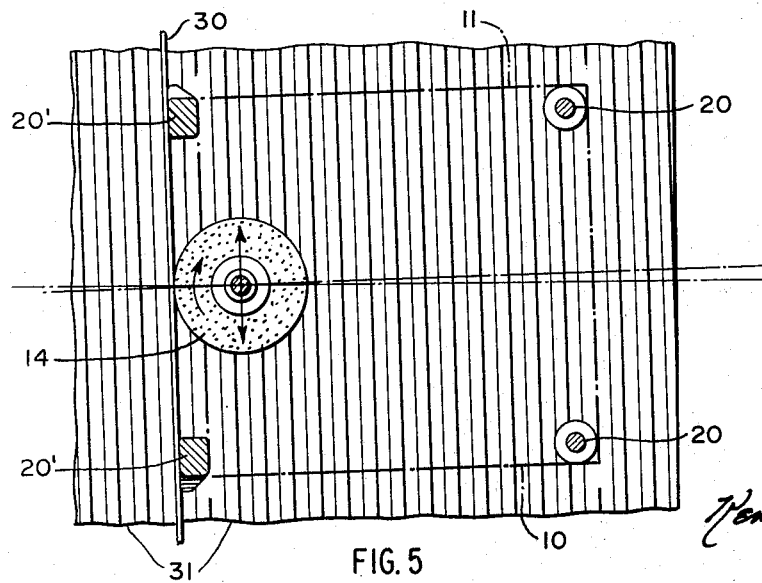
FIG. 5 is a fragmentary view as seen from beneath the tool, showing the position of the grinding wheel in its operation.

The thread as best shown in FIGS. 2 and 4 is of the buttress type and has a flat radial face on the entrance side of the drum and a 45° face on the other side. In FIG. 4 the end face of the grinding wheel 14 is shown as operating on a radial face of the blade as imparting a formation to the blade that includes a cutting edge of substantial width. It has been found desirable to impart a slit of substantial width or to form a fillet at the base of the siping cut rather than a sharp slit.

As already noted the carrier block 13 is mounted for longitudinal adjustment in the guideway provided by the upstanding edges of the side sections 10 and 11. The block 13 is connected to an outwardly extending threaded screw 23 and this carries at its outer end an adjusting knob 21. This arrangement provides a limited longitudinal adjustment of the grinding wheel which may be necessary or convenient to bring the grinding face of the wheel into precise conformity with the thread of the drum.

An angular adjustment of the operating face of the grinding wheel may be effected by rocking the frame through the medium of the guide studs 20. The siping machine of the application above identified is arranged to operate with a single blade forming siping cuts with a spacing of seven to the inch or with two blades set with a spacing of 3 ½ siping cuts to the inch. It will be apparent that the grinding tool herein disclosed may be successfully used with either of these arrangements of the blade.

In practice the tool is placed by hand upon the drum 31 with the guide studs 20, 20' resting in the valley of the threads and the divergent side sections of the frame embracing the convex side of the drum. The grinding tool is thus advanced in a helical path toward the blade 30 and successive grinding passes are made as the grinding wheel is progressively advanced by hand or by means of the adjusting screw 23.

Having thus disclosed my invention and described in detail an illustrative embodiment thereof, I claim as new and desire to secure by Letters Patent:

1. Apparatus for sharpening a blade extending outwardly from a cylindrical drum peripheral surface, said drum having a pronounced helical thread, said blade having a cutting edge aligned with a helical path formed by said thread of said drum, which comprises:

a grinding wheel, means for rotating the grinding wheel, a frame arranged to engage said drum, said frame supporting said grinding wheel, so that the axis of rotation of said grinding wheel is substantially perpendicular to the longitudinal axis of said drum, said frame including:

means for guiding said frame and grinding wheel in a helical path formed by the thread of said drum, a first adjustment means for varying the position of said grinding wheel relative to said frame, along a path substantially parallel to the longitudinal axis of said drum, and a second adjustment means independent of said first adjustment means for varying the angle of the axis of rotation of said grinding wheel relative to the longitudinal of said drum.

2. Apparatus as described in claim 1, wherein an open guideway is formed at one end of said frame, and said grinding wheel is disposed in a carrier slideably mounted in said guideway.

3. Apparatus as described in claim 1, wherein the frame comprises two convergent side sections merging at an acute angle, and said means for guiding said frame in a helical path includes two fixed guide studs each disposed on said frame, said guide studs adapted to fit into the helical path formed by said thread of said drum.

4. Apparatus as described in claim 3, wherein said second adjustment means includes two adjustable guide studs on said frame spaced from said fixed guide studs and positioned to contact said drum.

5. Apparatus as described in claim 1, wherein said second adjustment means includes two adjustable guide studs on said frame and positioned to contact said drum.

* * * * *